A. L. BINGHAM.
GLASS WORKING MACHINE.
APPLICATION FILED MAR. 25, 1913.
1,182,448.
Patented May 9, 1916.
8 SHEETS—SHEET 3.
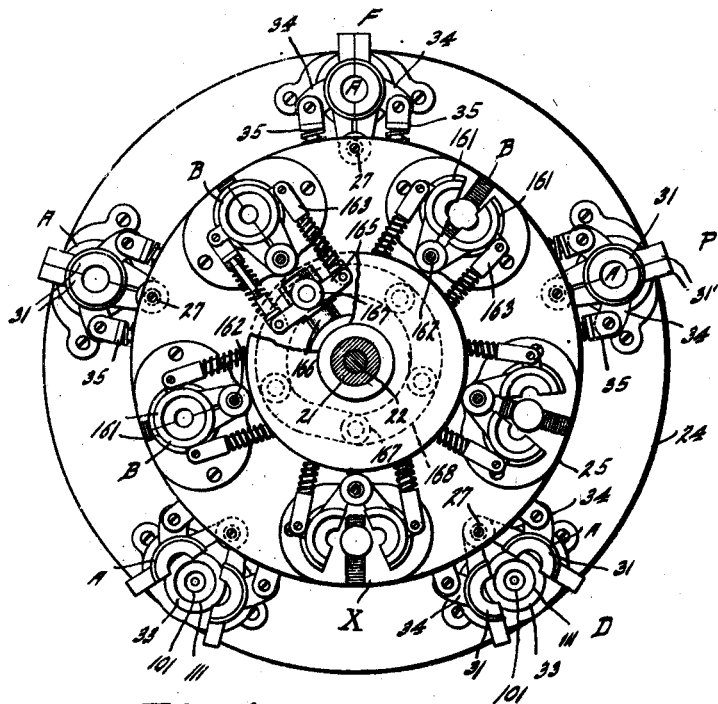
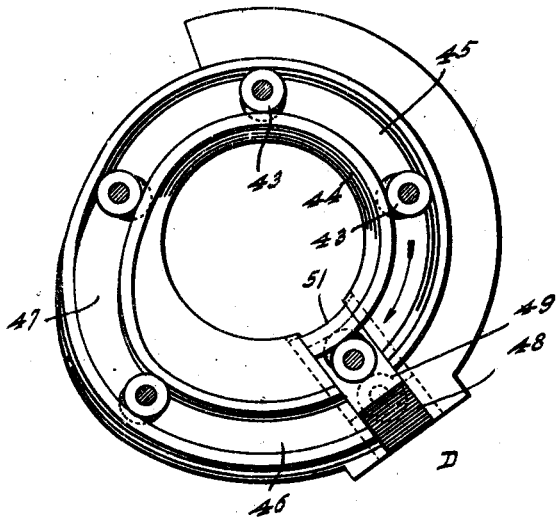
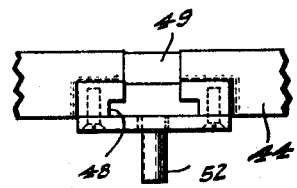
Witnesses
Frank A. Fahle
Josephine Gasper
Inventor
Alvah L. Bingham,
By Arthur M. Hood
Attorney A. L. BINGHAM.
GLASS WORKING MACHINE.
APPLICATION FILED MAR. 25, 1913.
1,182,448.
Patented May 9, 1916.
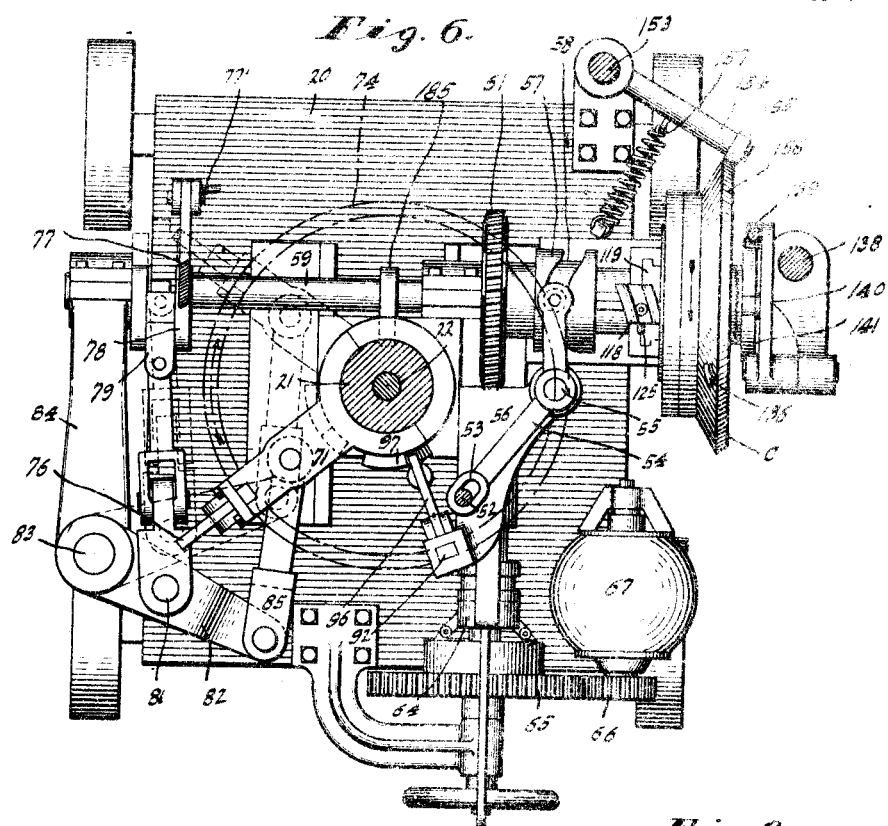
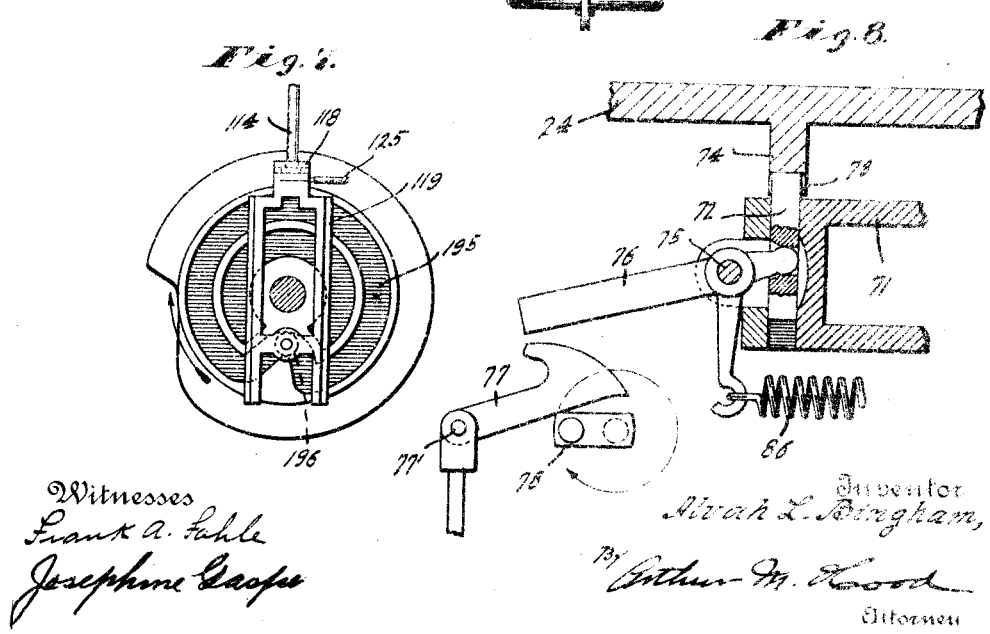
Witnesses
Frank A. Fahle
Josephine Gaofer
Inventor
Alvah L. Bingham,
By Arthur M. Hood
Attorney

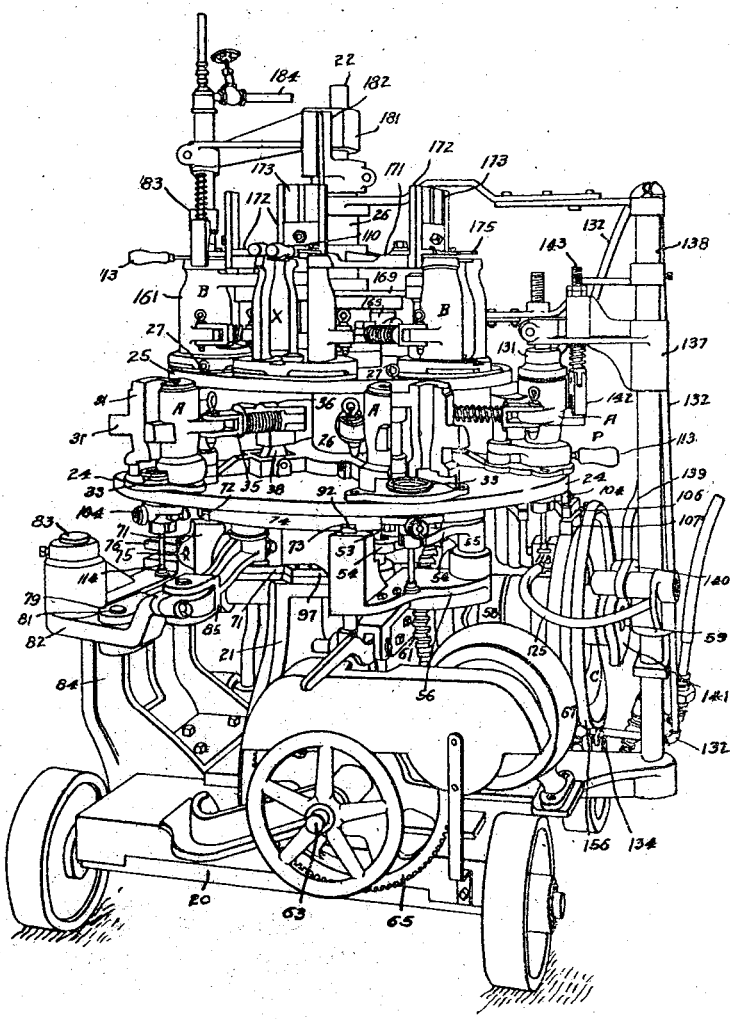

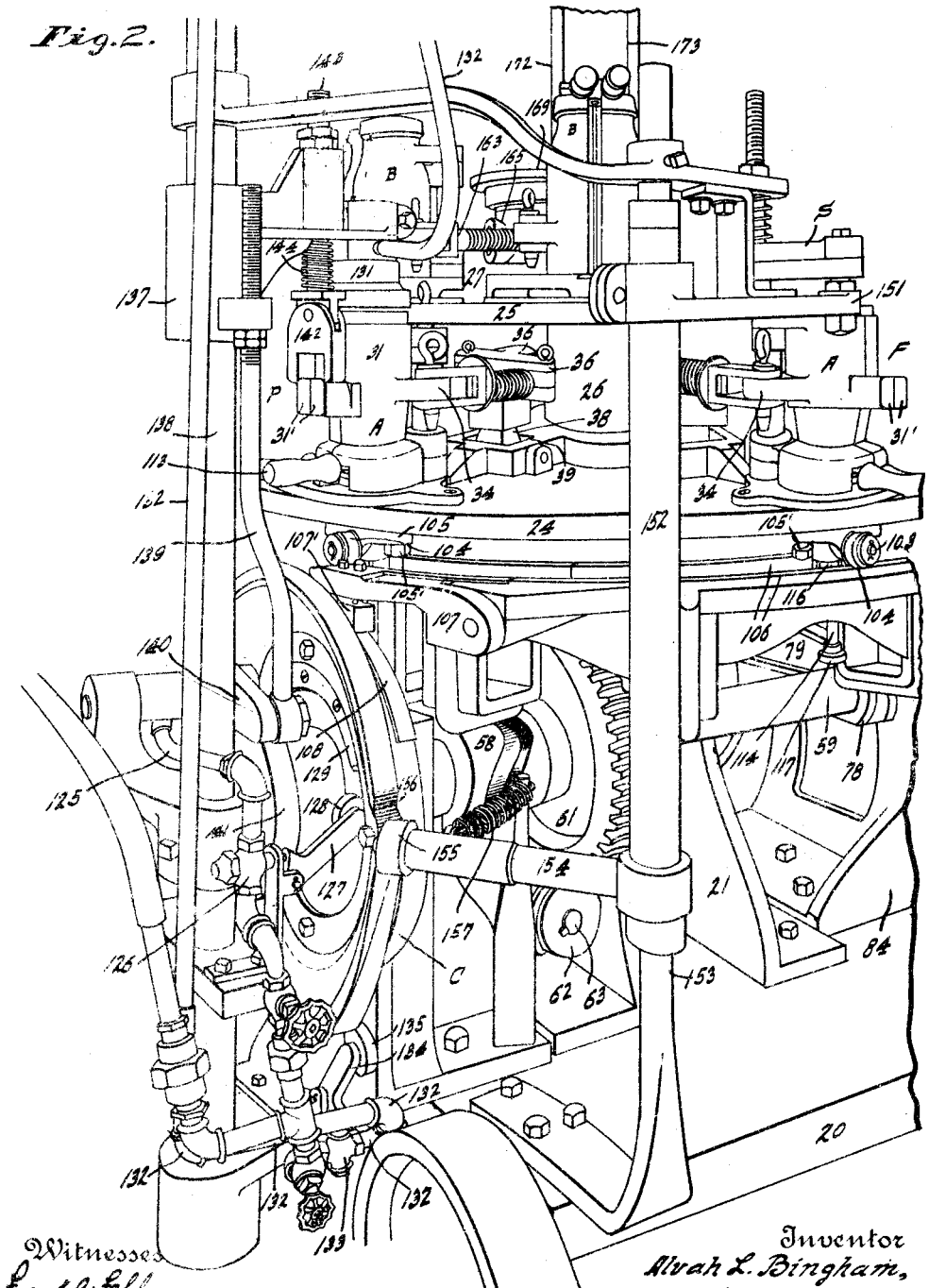

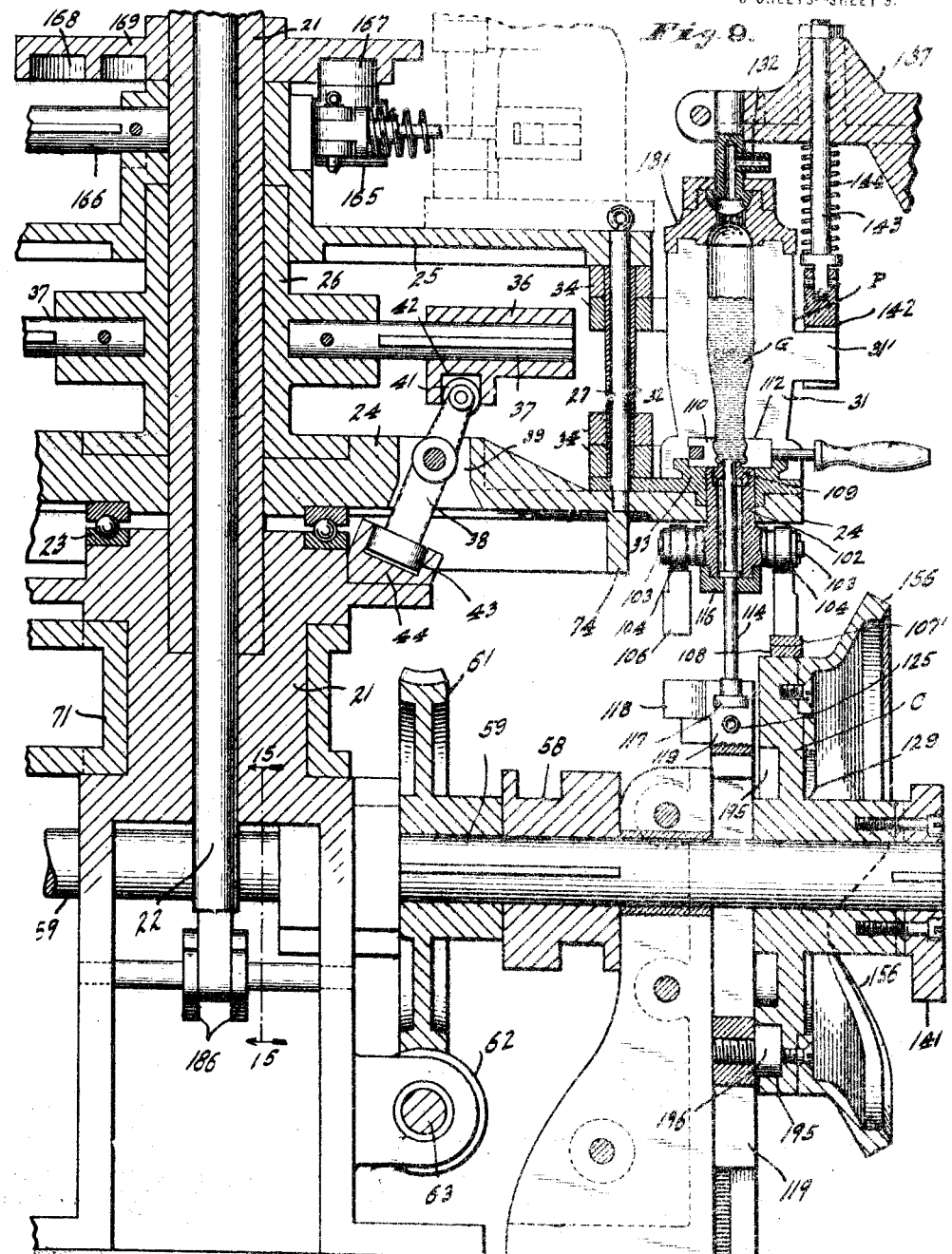

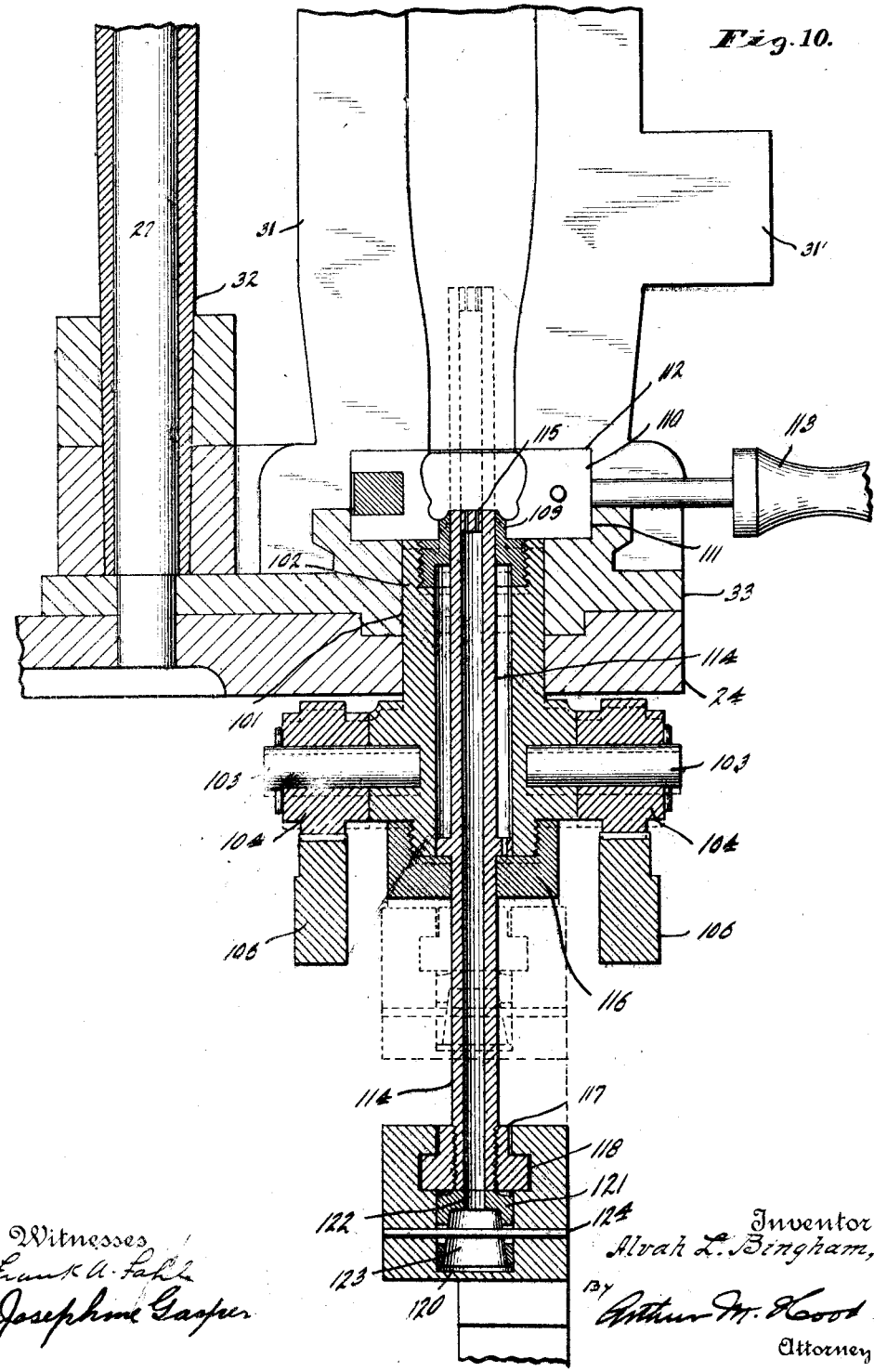

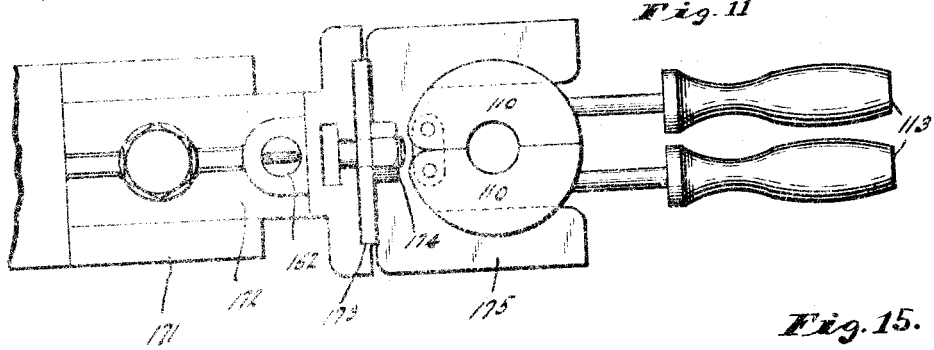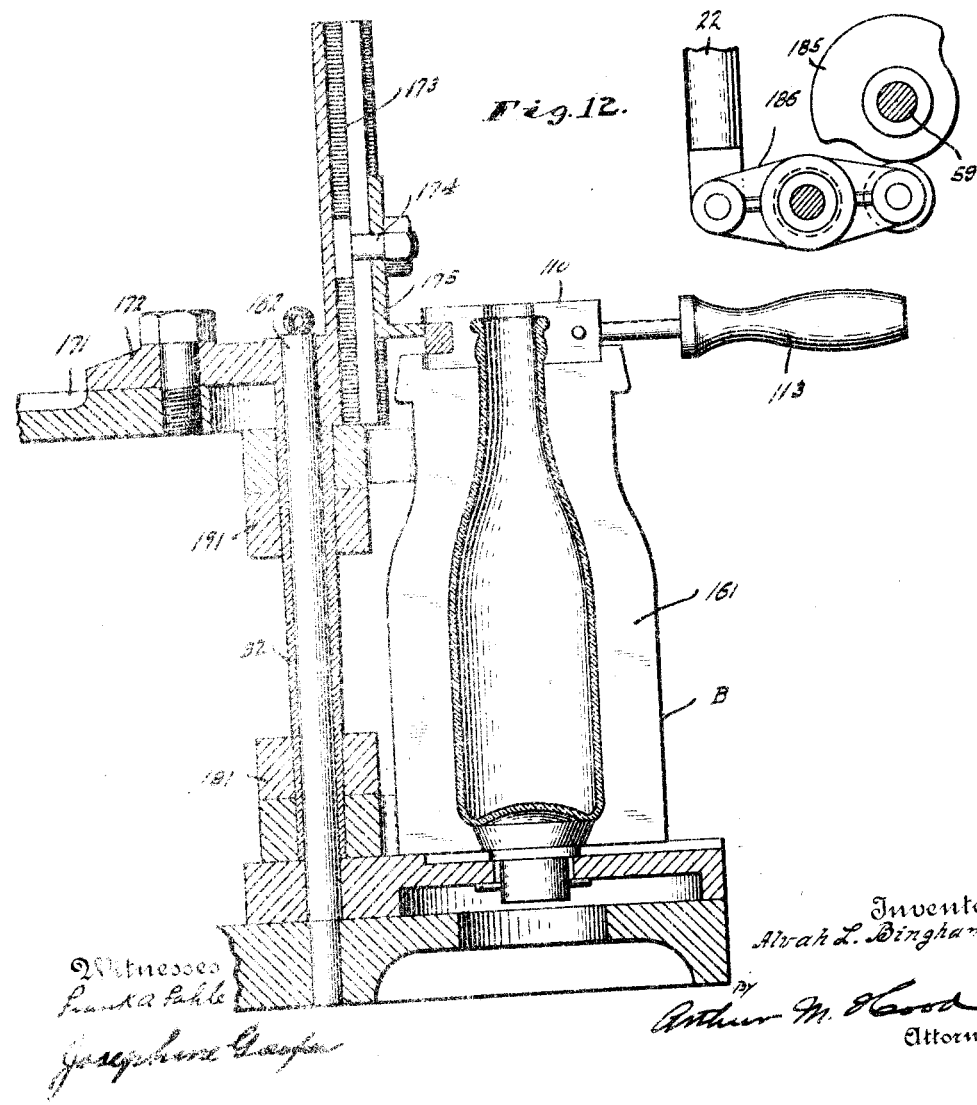

A. L. BINGHAM.
GLASS WORKING MACHINE.
APPLICATION FILED MAR. 25, 1913.

1,182,448.

Patented May 9, 1916.
8 SHEETS—SHEET 8.

Witnesses
Frank A. Fahle
Josephine Gasper

Inventor
Alvah L. Bingham
By Arthur M. Hood
Attorney

UNITED STATES PATENT OFFICE.

ALVAH L. BINGHAM, OF MUNCIE, INDIANA, ASSIGNOR TO BALL BROTHERS GLASS MANUFACTURING COMPANY, OF MUNCIE, INDIANA, A CORPORATION OF INDIANA.

GLASS-WORKING MACHINE.

1,182,448.  Specification of Letters Patent.  Patented May 9, 1916.

Application filed March 25, 1913. Serial No. 756,772.

*To all whom it may concern:*

Be it known that I, ALVAH L. BINGHAM, a citizen of the United States, residing at Muncie, in the county of Delaware and State of Indiana, have invented a new and useful Glass-Working Machine, of which the following is a specification.

The object of my invention is to produce a semi-automatic machine for receiving and forming successive charges of molten glass, the construction being such that unskilled labor may be utilized in its manipulation, the several parts being, to that end, so conveniently arranged with relation to each other that no great skill is required in manually assisting the mechanism to produce a marketable piece.

While the mechanism has been especially designed for the production of so-called "narrow neck" ware, it will, of course, be understood that it is not limited to such use.

The accompanying drawings illustrate my invention.

Figure 13:
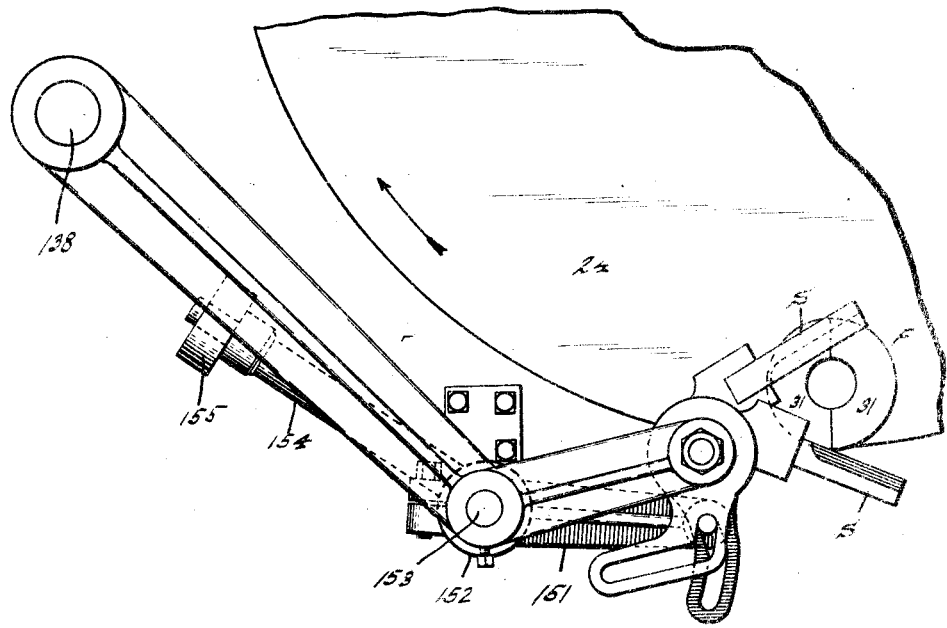
Figure 14:
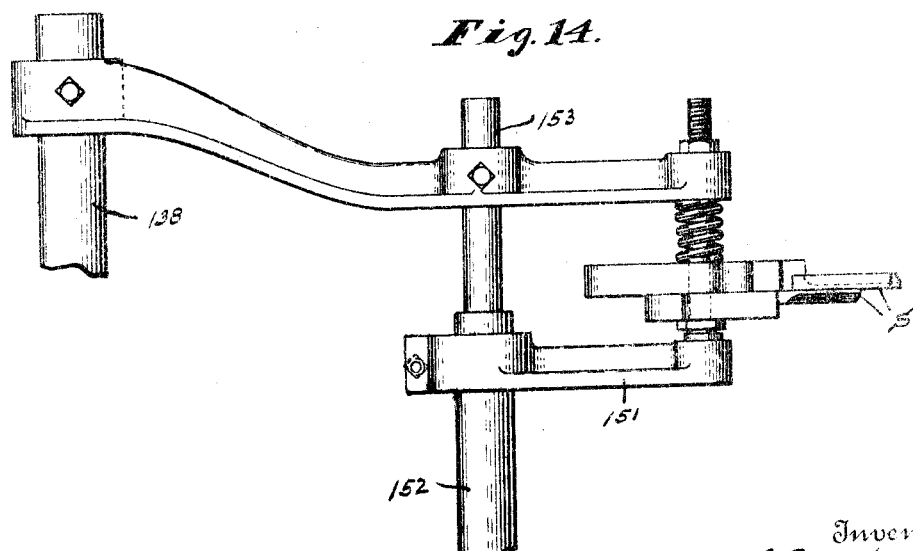

Figure 1 is a perspective view of the machine, the discharging blank-mold and the receiving blow-mold being in the foreground; Fig. 2 a fragmentary perspective view taken from a line of sight about 90 degrees to the right of the line of sight of Fig. 1; Fig. 3 is a horizontal section, immediately above the blow-molds and the cam for operating the same; Fig. 4 a plan of the cam used for automatically opening and closing the blank molds; Fig. 5 a fragmentary side elevation of a portion of the cam shown in Fig. 4; Fig. 6 a horizontal section just below the blank-mold table; Fig. 7 a fragmentary detail of the reciprocating head for manipulating the neck plunger, and the cam for reciprocating the same; Fig. 8 a vertical sectional detail of the connection between the blank-mold table and the arm for driving the same; Fig. 9 a fragmentary axial section of the machine through one of the blank-molds when in blank-forming position; Fig. 10 a vertical section, on a larger scale, of the blank-forming members; Fig. 11 a plan of the neck-ring receiver (and associated neck-ring) of one of the blow molds; Fig. 12 a vertical sectional detail of one of the blow-molds and associated parts; Fig. 13 a fragmentary plan showing the shearing mechanism; Fig. 14 an elevation of the parts shown in Fig. 13; and Fig. 15 a section on line 15—15 of Fig. 9.

In the drawings, 20 indicates a transportable carriage upon which the entire mechanism is supported so that it may be easily transported from one furnace to another and adjusted into glass-receiving position with relation thereto. Mounted upon the carriage 20 is a central standard 21 through which a vertically reciprocable rod 22 is projected. Journaled upon the standard 21, and supported upon a bearing 23 arranged upon a horizontal shoulder of the standard 21, is a rotatable mold-carrying structure which comprises fundamentally a horizontal blank-mold table 24, a smaller horizontal blow-mold table 25 and a spacing collar 26 united together so as to rotate about the standard 21 as a unit.

Extending between the two tables near the edge of table 25, are several vertical pivot pins 27 which are circumferentially spaced and which may be readily withdrawn. In the machine illustrating the present drawings, there are five of these pivot pins and each pin forms a support for a blank-mold A. This blank-mold may be of any desired form and the details of construction may, of course, be varied to a considerable extent without departing from the spirit of my invention. The blank-mold shown in the drawings comprises a pair of mating members 31, 31 hinged upon a sleeve 32 which receives pin 27. The two blank mold members 31 are provided with mating mold cavities upon their adjacent faces and at their lower ends are adapted to fit over a base plate 33 which is mounted upon the table 24. Each mold member 31 is provided with an ear 34 to which is pivoted one end of a spring operating-link 35 of a form well known in glass-working machines. The opposite ends of the links 35 are pivotally connected to a cross head 36 slidably mounted upon a radially projecting pin 37, see Fig. 9, the several pins 37 being carried by the spacing collar 26 of the mold table structure.

The blank mold sections 31, 31 are intermittently swung upon their pivots at proper times by radial movement of the appropriate cross head 36 and in my present machine I have found it desirable to accomplish the opening movement of the blank mold very quickly at a time when the mold table is stationary, because the glass blank, in the present machine, is formed in an inverted position and, in order that the blank may not become distorted, it is desirable that it be supported by the blank mold as long as possible and that, when released, the condition of the adjacent portions of the machine shall be such that the operative may easily and quickly manually transfer the blank from its inverted position to a depending position adjacent the appropriate blow mold. In order to accomplish this desired result, each cross head 36 is moved radially by means of a pivoted lever 38 carried upon the blank-mold table 24 and projecting through a perforation 39 therein. The upper end of each lever 38 is provided with a roller 41 taking within a recess 42 in the adjacent cross head 36; and at the lower end is provided with a roller 43 fitted within the runway of cam 44. This runway comprises a small-radius portion 45 which is concentric with the axis of table 24; with a large-radius portion 46 which is concentric with the axis of table 24; and with a portion 47 which connects the portions 46 and 45. The adjacent and unconnected ends of the portions 45 and 46 are radially spaced from each other by an amount equal to the total throw of the cam and this amount is equal to the required movement of roller 43 around the pivot of lever 38 to produce the required opening movement of cross head 36. This opening movement of cross head 36 is desired at a time when the table structure is stationary and, therefore, in order to accomplish this movement, the cam 44, between portions 45 and 46 of the cam, is provided with a radial guide 48 in which is mounted a radially movable block 49 provided at its inner end with an axially extending shoulder 51 of sufficient angular extent to bridge the angular distance between the runways 45 and 46 so that, when any roller 43 is brought, by the rotation of the table structure from the runway 45 into a position opposite the shoulder 51 (as indicated at the position D, Fig. 4) the block 49 may be shifted radially outwardly in guide 48 so as to bring the shoulder 51 into circumferential alinement with the inner wall of the runway portion 46. Block 49 is provided on its under side with a downwardly projecting pin 52 which takes into a slot 53 formed in one arm of a lever 54 pivoted at 55 upon a bracket 56 bolted to standard 21. The opposition end of lever 54 is provided with a pin 57, see Fig. 6, which lies within the slot of a cam 58 carried by the main drive shaft 59. Shaft 59 is driven in any suitable way, as, for instance, by a worm wheel 61 engaging a worm 62 carried by a shaft 63 provided with a clutch 64 engaging a gear 65 driven by a pinion 66 carried by a motor 67.

The table structure may be advanced step by step by any suitable mechanism. In the present instance, the table structure carries five sets of molds and is, therefore, advanced one-fifth of a revolution each step. In order to accomplish this movement, and at the same time firmly hold the table against improper movement, I provide the following mechanism: Journaled upon standard 21 beneath the mold table 24 is an arm 71 which, at its outer end, is provided with a vertically reciprocable pawl 72 adapted to take into any one of a series of notches 73 formed in the lower edge of a circular flange 74 depending from the under side of table 24. Pivoted at 75 upon arm 71 is a lever 76 one end of which engages pawl 72 and the other end of which is in position, at the end of each advancement of the table (as indicated in dotted lines in Fig. 6) to be engaged by a lever 77 pivoted at 77' upon a standard carried by the carriage 20, and this lever 77 rests upon and is reciprocated by one arm of the crank 78 carried by shaft 59. Journaled upon crank 78 is one end of a flexible connecting rod 79, the opposite end of which is pivoted at 81 to a horizontally swinging lever 82 pivoted at 83 upon a bracket 84 carried by carriage 20. The outer end of lever 82 is connected by a link 85 with arm 71 as clearly indicated in Fig. 6. Pawl 72 is normally urged upwardly by means of a spring 86 acting upon lever 76 (Fig. 8). In order to hold the mold table structure in its position of rest and during the return movement of the operating arm 71, I mount, in the outer end of bracket 56, a vertically reciprocating catch 92 which is substantially identical with pawl 72 and this catch 92 is controlled in its movement by a lever 96 which is a counterpart of lever 76, a spring similar to spring 86 acting upon the lever 96 to normally urge the catch 92 upwardly against flange 74 so that it may successively enter the several notches 73 just as the mold table structure comes to rest after an advancement. In order to withdraw catch 92 from the table when the arm 71 is in position to engage and advance the table, I provide said arm with a cam 97 which, when the arm 71 nears the position shown in full lines in Fig. 6, passes beneath the adjacent end of lever 96, thus withdrawing catch 92 from the adjacent notch 73.

Returning now to the blank mold and the blank forming mechanism. Each base plate 33 is provided with a vertical perforation 101 coaxial with the cavity of the blank mold and mounted in this perforation is a vertically reciprocable hollow head 102 provided at its lower end, below table 24 with a pair of radial trunnions 103 upon which rollers 104 are journaled. Each head 102 is also provided with a pair of circumferentially extending ears 105 through which headed bolts 105′ pass, the said bolts being carried by the under-side of table 24 and being of such length as to permit vertical movement of the head 102. In order to control the vertical movement of head 102, I provide the arc-shaped cam tracks 106 which have a circumferential extent beginning somewhat before the filling position F (Fig. 3) and extending beyond the blank-forming position P. The discharge ends of these cam tracks 106 are carried by a swinging arm 107 the end of which has a limited vertical movement which is produced by engagement of this arm (or a shoe 107′ adjustably attached to its lower face) and a cam face 108 carried by the main cam C which is mounted upon the drive shaft 59. The upper end of head 102 carries a nipple 109 over which the neck ring mold 110 fits, and these two parts coöperate to form the mouth of the bottle. The neck ring 110 fits within a socket 111 formed in the base plate 33 and within a socket 112 formed at the lower end of the blow mold members 31 and this neck ring is formed in two parts in the usual manner, as clearly indicated in Fig. 11, each part having a handle 113 by means of which it may be manipulated.

The nipple 109 is tubular, and vertically reciprocable through this nipple is a hollow plunger 114 of a general form well known in the art, said plunger having at its upper end small perforations 115 through which air may be readily forced but so small that the molten glass will not enter. Plunger 114 is guided, by collar 116, within the bore of head 102 and at its lower end is provided with a shoe 117 which, when the mold reaches the blank-forming position P (Figs. 3, 9 and 10) passes into a guide 118 carried at the upper end of a vertically movable cross head 119. The guide 118 and head 117 are preferably formed for vertical interlocking engagement and beneath the guide I form an air chamber 120 within which is vertically reciprocable an air cup 121 which, at its upper end, is provided with a perforation 122 adapted to register with the bore of stem 114 and at its lower end is provided with a chamber 123 of larger diameter than the opening 122. Cup 121 is permitted a limited vertical play within chamber 120 by a cross pin 124. Leading into chamber 120 is an air supply pipe 125 which receives its air through a valve 126, said valve being operated intermittently by a lever 127 carrying a roller 128 at its outer end in position to be operated by a cam 129 carried by the main cam C.

Arranged in vertical alinement with the blank-forming position P of the blank mold, is a blow head 131 which successively fits the upper ends of the blank molds and is supplied with compressed air through a pipe 132 in which is placed a valve 133 operated by a lever 134 which lever is provided with a roller 135 intermittently operated by a cam portion 136 carried by the cam C. The blow head 131 is carried by a vertically reciprocating arm 137 which is reciprocably mounted upon a post 138 carried by the carriage 20, and the arm 137 is reciprocated by means of a pitman 139 connected to a lever 140 operated upon by a cam 141 carried by shaft 59. Arm 137 carries a mold clamp 142 of usual type the jaw of which is adapted to straddle ears 31′ of the mold sections 31 so as to clamp the mold sections firmly together when the mold is in blank-forming position. This clamp is of an ordinary type and is carried by a vertically movable rod 143 mounted in arm 137 and normally urged downwardly by a spring 144.

Arranged vertically above the filling position F of the press molds is a glass shearing mechanism S of any desired type either of a form sufficient to cut the glass from a punty brought manually to the machine, or of a type proper to shear a stream of glass running directly from the furnace or other supply toward the filling position of the blank molds. In order to operate the shears S in proper time, I provide a lever 151 engaging the shears in a well known manner. This lever 151 is carried by a sleeve 152 journaled upon a vertical pin or stud 153 carried by the carriage 20. Secured to sleeve 152 is a lever or arm 154 provided with a roller 155 at its outer end and this roller is engaged by cam surface 156 formed upon the main cam C, the cam serving to swing the arm 154 in one direction while a spring 157 moves the arm in the opposite direction.

Mounted upon the blow-mold table 25 are blow molds B which are preferably spaced angularly between the blank molds. These blow molds are shown in the drawings as formed of two mating horizontally swinging sections 161 pivotally supported upon pivot pins 162. Each one of the blow mold sections is provided with an ear to which is pivotally connected one end of a spring link 163, of common form, and the opposite ends of each pair of these links are connected to a cross-head 165 each of which is slidably mounted upon a radially projecting pin 166 carried by the blow mold guide 25. Each cross-head 166 is provided at its top with a roller 167 which is arranged to travel in a suitable cam groove 168 formed in the lower face of cam 169 which is carried by the standard 21 so that the cam remains stationary while the mold table rotates around the standard and by this arrangement the blow molds are automatically opened and closed in a well-known manner. Journaled upon standard 21, near its upper end, is a rotary head 171 which carries some radially projecting brackets 172, one for each blow mold and these brackets 172 receive the upper ends of the pivot pins 162 of the blow molds and each of the brackets is also provided with vertical guide way 173 in which a clamping bolt 174 is mounted. Each clamping bolt 174 is adapted to retain a vertically adjustable neck-ring fork 175 in vertical position and this neck-ring fork (Figs. 11 and 12) is of such form as to receive the neck-ring 109 and hold it in proper position so that the parison may be inclosed within the blow mold sections when they are automatically brought together by the action of cam 169.

Mounted upon the upper end of rod 22, which projects beyond standard 21 is an arm 181 which projects between the arms of a vertically arranged fork 182 carried by the upper end of standard 21. Arm 181 carries at its outer end a blow head 183 of common form supplied with air through pipe 184 and the rod 22, by means of which the blow head is reciprocated, is moved up and down by means of a cam 185 mounted upon the main drive shaft 59 and operating upon a lever 186 which engages the rod 22.

Press or blow molds formed of two horizontally swinging mating sections are very common and it has heretofore been customary to provide a straight pivot pin for connecting the two sections and difficulty has been experienced in keeping the molds so that they will mate accurately because of the unavoidable wear of the pivotal connection. It is in order to avoid this difficulty that the pivot sleeve 32 has been provided, said sleeve having a straight bore for the reception of the pivot pins 27 or 162. Externally the pivot sleeves 32 are axially tapered and the bores through the mold section ears 191 are similarly tapered so that, when any wear occurs between the ears and the tapered sleeve, the slight change in axial position of the sleeve relative to the ears takes up the wear and keeps the mold members in proper mating condition.

In operation, the blank molds and blow molds will be automatically opened and closed, in the manner already described, as the rotary mold carrying structure is advanced step by step and when a blank mold has been closed and brought to the position F (Fig. 3) the charge of glass will be inserted in the blow mold by any suitable means, for instance by hand gathering, by a continuous stream, or otherwise and properly cut by shears S. The next movement of the rotary structure brings the filled blank mold to the position P (Fig. 3) beneath the head 131 and in this position the head 117 (Fig. 10) has been brought into guide 118 immediately above valve 121. Thereupon head 137 is depressed so as to bring head 131 upon the upper open end of the blank mold and fork 142 straddling ears 31's. When this has occurred, cam portion 136 of cam C will cause an opening of valve 133 so as to fill the upper end of the blank mold with air under pressure so as to compact the glass G (Fig. 9) down into the neck of the mold. At the same time the cross head 119 will be vertically reciprocated by the action of cam groove 195 upon roller 196 thus projecting stem 114 upwardly into the glass as indicated by dotted lines in Fig. 10, thus starting a blow opening in the blank, and, at about the time this upward projection of stem 114 is completed, cam portion 129 operates to open valve 126 and permits a slight flow of air through pipe 125 into chamber 120 thus shifting cup 121 upwardly to properly contact with the lower end of stem 114 and permitting the air to flow upwardly through said stem and fill the opening in the parison as the stem 114 descends. Immediately upon the upward projection of stem 114 into the glass, the nipple 109 is withdrawn downwardly by a depression of arms 107 due to the withdrawal of cam portion 108 thus preventing the nipple from becoming too greatly heated by the glass.

As soon as these several operations have taken place, the arm 137 is moved upwardly so as to withdraw fork 142 and head 131 from the blank mold (the air supply through valve 133 being in the meantime cut off by the action of the cam portion 136) and as soon as this occurs the table is given another advancement. Immediately upon the stopping of the table, the roller 43, associated with the mold in which the blank-forming action has just taken place, having arrived at the position D in cam 44 (Fig. 4), and cam 57, operating upon lever 54, shifts the block 49 from the position shown in full lines in Fig. 4 to the position shown in dotted lines, thus quickly opening the blow mold and exposing the hot and plastic parison in an inverted position. Immediately the operator grasps the handles of the neck ring which is supporting this parison and by a very simple and readily learned movement withdraws the neck ring and parison, inverts them, and delivers the neck ring, with the parison depending therefrom, to the open blow mold at the point X (Fig. 3) so that, upon the next movement of the table, the blow mold will be automatically closed around the parison and brought to a position beneath the blow head 183 which is thereupon lowered on the neck ring and air delivered therethrough into the parison so as to expand it into the blow mold. As soon as the table starts in its advancement, block 49 is freed from the roller 43 which it has engaged (said roller passing into the portion 46 of cam 44) and cam 57, by means of arm 54, returns the block 49 to its normal position so that it will be in position to receive an oncoming roller 43 from the cam portion 45 of cam 44.

With the exception of the transfer of the parison from the press mold to the blank mold, the operation and use of the machine is entirely automatic and by arranging the series of blank molds and blow molds in the manner set forth, it has been found that comparatively unskilled labor may be utilized very efficiently for this manual portion of the operation, the particular arrangement of blow molds above and in a smaller circle than the blank molds having proved to be very convenient and desirable.

I claim as my invention:

1. In a glass working machine, the combination of a pair of coaxial vertically-separated rotary mold-carrying tables, and the lower table of larger diameter than the upper table, a plurality of molds carried by the lower table radially beyond the upper table and each comprising a neck-ring-receiving portion at its lower end, a plurality of molds carried by the upper table, and neck-ring-receiving members associated with said molds at their upper ends.

2. In a glass working machine, the combination of a pair of coaxial vertically-separated rotary mold-carrying tables, a plurality of molds carried by the lower table and each comprising a neck-ring-receiving portion at its lower end, a plurality of molds carried by the upper table, and neck-ring-receiving members associated with said molds at their upper ends.

3. In a glass working machine, the combination of a pair of coaxial vertically-separated rotary mold-carrying tables, and the lower table of larger diameter than the upper table, a plurality of molds carried by the lower table radially beyond the upper table and each comprising a neck-ring-receiving portion, a plurality of molds carried by the upper table, and neck-ring-receiving members associated with said molds.

4. In a glass working machine, the combination of a rotary mold-carrying table, a plurality of multi-member molds carried by said table, a plurality of actuating members carried by the table one for each mold, a stationary cam-track and a complementary movable cam-member arranged to be traversed by said actuators in the movement of the table, and means for intermittently shifting the movable cam-member to actuate the actuator through a portion of its mold-operating movement.

5. In a glass working machine, the combination of a rotary mold carrier, a mold carried thereby, a nipple carried by the carrier in alinement with the mold, a hollow plunger mounted in said nipple and projectable upwardly therethrough, a track for supporting said nipple, a cam intermittently supporting and withdrawable from said track, a reciprocable head arranged to receive the plunger, an air supply pipe delivering to said head and the plunger when in the head, means for reciprocating said head, means for controlling flow of air to the plunger, and means for delivering compressed air to the upper end of the mold when the plunger is in position for action.

6. In a glass working machine, the combination of a rotary mold carrier, a mold carried thereby, a nipple carried by the carrier in alinement with the mold, a hollow plunger mounted in said nipple and projectable upwardly therethrough, a track for supporting said nipple, a cam intermittently supporting and withdrawable from said track, and a reciprocable head arranged to receive the plunger.

7. In a glass working machine, the combination of a rotary mold carrier, a mold carried thereby, a nipple carried by the carrier in alinement with the mold, a hollow plunger mounted in said nipple and projectable upwardly therethrough, a track for supporting said nipple, a cam intermittently supporting and withdrawable from said track, a reciprocable head arranged to receive the plunger, an air supply pipe delivering to said head and the plunger when in the head, means for reciprocating said head, and means for controlling flow of air to the plunger.

8. In a glass working machine, the combination of a rotary mold carrier, a mold carried thereby, a nipple carried by the carrier in alinement with the mold, a hollow plunger mounted in said nipple and projectable upwardly therethrough, a reciprocating head provided with a guide-way in its upper end to receive the lower end of the plunger and provided with an air chamber, and an air cup arranged in said chamber and vertically movable under air pressure to registry with the lower end of the plunger when in the guide-way.

9. In a glass working machine, the combination of a horizontal rotary mold carrier, a plurality of angularly spaced molds carried thereby, a second horizontal rotary mold carrier arranged at a higher level adjacent the first table, a plurality of molds carried by the second carrier and angularly spaced relatively and relative to the first series of molds, and a mold section transferable from a mold of one series to a mold of another series.

In witness whereof, I have hereunto set my hand at Indianapolis, Indiana, this thirteenth day of March, A. D. one thousand nine hundred and thirteen.

ALVAH L. BINGHAM.

Witnesses:
 FRANK C. BALL,
 WM. C. PICKEL.